Patented Sept. 28, 1943

2,330,792

UNITED STATES PATENT OFFICE 2,330,792

METHOD OF TREATING TALL OIL

Anthony F. Oliver and Robert C. Palmer, Pensacola, Fla., assignors to Newport Industries, Inc., Pensacola, Fla., a corporation of Delaware No Drawing. Application November 15, 1939, Serial No. 304,581

4 Claims. (Cl. 260—97.5)

This invention relates to a method of treating tall oil and to a product made thereby. More particularly the invention pertains to a method of stabilizing tall oil and to a stable tall oil.

Tall oil is a by-product in the manufacture of paper pulp by digestion of wood with alkaline liquors, in particular, aqueous alkaline solutions of sodium sulfide. Crude tall oil is produced by acidification of sodium soaps salted out of the alkaline liquor and constitutes a dark, evil smelling liquid consisting of a mixture of roughly equal proportions of resin acids and fatty acids together with minor proportions of esters and unsaponifiable matter, chiefly plant sterols. The evil smell is thought to be due to sulphur compounds. On standing this crude tall oil tends to separate into a liquid and a solid phase, the latter comprising mainly a fraction of the resin acids present in the tall oil.

Heretofore the commercial use of tall oil has been limited, due to its dark color, unpleasant odor, and its tendency to separate into more than one phase.

It is therefore an important object of the present invention to provide a pale stable tall oil of unobjectionable odor.

Another object of this invention is to provide a method of preparing a pale stable tall oil of unobjectionable odor.

Other and further objects of the present invention will become apparent from the following description and appended claims.

Broadly speaking, the present invention involves a heat treatment of tall oil at temperatures above 250° C. but below the temperature at which substantial decomposition occurs, coupled with a partial neutralization of the fatty and resin acids present in the tall oil. This combined heat treatment and partial neutralization removes a substantial portion of the malodorous sulfur compounds and yields a bleached stable tall oil that does not tend to precipitate a solid resinous phase. If desired the novel combined heat treatment and partial neutralization may be preceded or followed by other therefrom different purifying steps.

In proceeding in accordance with this invention it is expedient initially to subject the crude tall oil to a treatment with fuller's earth, adsorbent clay, activated charcoal or like materials to remove substantially all oxidized bodies and a major proportion of the sulfur compound present. Suitably the tall oil is filtered through an amount, by weight, of fuller's earth at least equal to the amount of tall oil being treated. The crude tall oil is dissolved in a solvent such as petroleum naphtha prior to the treatment with fuller's earth. Certain solid insoluble color bodies amounting to about 1.5 per cent of the crude oil may then, if desired, be separated by decantation. The solution is then caused to percolate through a bed of fuller's earth. The degree of decolorization effected can be controlled to some extent by the amount of fuller's earth used, although complete removal of color is difficult. A suitable ratio of fuller's earth to tall oil is two parts to one. Such treatment of an 18 per cent solution of crude tall oil gives, after removal of the solvent, an 80 per cent yield of pale, nearly odorless tall oil. The 20% of the crude tall oil retained by the fuller's earth consists of a black, evil smelling liquid somewhat more viscous than the crude tall oil.

The following analyses will indicate the effect of the hereinabove outlined illustrative treatment with fuller's earth of a solution of crude tall oil in petroleum naphtha.

Crude tall oil

| | |
|---|---|
| Specific gravity at 25° C. | 0.980 |
| Acid value | 167.2 |
| Color (Hellige Klett scale) | 9L–9 |
| Viscosity (Gardner Holt scale) | Q |
| Per cent fatty acids | 52.2 |
| Per cent resin acids | 38.8 |
| Per cent naphtha insoluble | 1.5 |

Tall oil treated with 2 parts fuller's earth

| | |
|---|---|
| Per cent yield | 80.0 |
| Acid value | 173.0 |
| Color (Hellige Klett scale) | 4L |
| Viscosity (Gardner Holt scale) | M |
| Saponification value | 178.5 |
| Ester value | 5.5 |
| Per cent unsaponifiable matter | 6.5 |
| Per cent resin acids | 37.5 |
| Per cent fatty acids | 53.0 |
| Specific rotation | –12 |
| Per cent bound sulfur | 0.02 |

Tall oil fraction retained by fuller's earth

| | |
|---|---|
| Color | Pitch black |
| Acid value | 133 |
| Saponification value | 154 |
| Ester value | 21 |
| Per cent resin acid | 34.2 |
| Per cent fatty acid | 57.0 |

This fraction is believed to comprise the bulk of the sulfur compounds to which the evil smell of the crude tall oil is probably due. The fact that the ratio between fatty and resin acids in this fraction does not differ greatly from the ratio in the crude tall oil proves that the color bodies removed by the fuller's earth are derived both from the fatty and the resin acids.

The following analyses show the effect of treating with fuller's earth a tall oil of somewhat different composition:

Crude tall oil

| | |
|---|---|
| Acid value | 165.8 |
| Color | Darker than 9L-9 |
| Viscosity | V |
| Per cent fatty acids | 48.7 |
| Per cent resin acids | 43.5 |
| Per cent naphtha insoluble | 2.2 |

Tall oil treated with 2 parts fuller's earth

| | |
|---|---|
| Per cent yield | 85 |
| Acid value | 171 |
| Color | 4L-3 |
| Viscosity | T |
| Per cent unsaponifiable | 10.6 |
| Per cent resin acids | 47.1 |
| Per cent fatty acids | 42.3 |

If a crude tall oil contains ferric impurities which are not completely removed by treatment with fuller's earth, a small amount of oxalic acid, for instance, less than 1 per cent, may be added thereto. The iron compounds then formed are insoluble in petroleum naphtha and may be removed prior to the treatment with fuller's earth together with the hereinabove mentioned insoluble color bodies.

Selective extraction with, for instance, furfural, may be substituted for treatment with fuller's earth, although with less satisfactory results, for it is difficult to go beyond a relatively dark color by selective extraction. The following table shows the final results of three successive extractions of a naphtha solution of tall oil with respectively, 40 per cent, 20 per cent, and 20 per cent of furfural by weight of the tall oil treated.

| | |
|---|---|
| Per cent yield | 82 |
| Acid value | 174.8 |
| Color (Hellige Klett scale) | 6-6L |
| Viscosity | K |

Although the hereinabove disclosed methods of purification involving treatment with fuller's earth or selective extraction yield after removal of the solvent by distillation or otherwise, a relatively pale tall oil and eliminate a major proportion of the malodorous sulfur compounds, still the resulting decolorized tall oil darkens rapidly and badly on exposure to air, while retaining its tendency to throw down a heavy precipitate of resin acids which on continued standing form large masses.

We have discovered that a combined heat treatment and partial neutralization will eliminate the tendency of tall oil to separate into a liquid and a solid phase, at the same time reducing substantially the tendency to darken and removing a large part of the residual sulfur.

Heat treatment alone reduces the tendency to crystallization but does not eliminate the tendency completely, as illustrated by the following experiment:

Tall oil having the hereinbelow tabulated characteristics was heated for 2 hours at 280°–285° C.

| | |
|---|---|
| Acid value | 176.0 |
| Color (Hellige Klett scale) | 4L-4 |
| Viscosity (Gardner Holt scale) | M |
| Specific rotation | −6°.5 |

The resulting oil had a color value of 3, a viscosity of M, and a specific rotation of +9°. After standing overnight this tall oil showed a slight cloudiness, which under a magnifying glass could be seen to consist of finely dispersed minute crystals.

Similarly a partial neutralization does not completely eliminate the tendency to crystallization. A tall oil having the above tabulated characteristics was treated with 3 per cent by weight, of soda ash, yielding an oil having a color value of 4L-4, an acid value of 139.0, and a viscosity Y. This oil also showed on standing a finely dispersed precipitate of minute crystals.

A combined heat treatment and partial neutralization, however, yields a quite pale nearly odorless oil that does not tend to precipitate a solid phase and which darkens but slightly even on prolonged standing.

In general the heat treatment is carried out at a temperature of from 260° to 300° C., and in some cases as high as 325° C. for a period of time ranging from 8 hours to 2 hours or 1 hour, and in some extreme cases to a period as short as ten minutes. Roughly speaking, the duration of the heat treatment of the tall oil in this process is inversely proportional to the temperature employed. In any case, the heat treatment is prolonged sufficiently to eliminate, in conjunction with a partial neutralization, the tendency of the tall oil to crystallize.

All fuller's earth should be completely removed from therewith treated tall oil prior to heat treatment.

A large part of the residual sulfur in the tall oil is eliminated during this heat treatment as hydrogen sulfide.

The partial neutralization of the tall oil is suitably effected by means of the common water soluble alkalies such as sodium or potassium hydroxide, or sodium or potassium carbonate. The amount of neutralization necessary to accomplish the desired effect is comparatively small, in most cases not exceeding 18 per cent of the acid contained in the tall oil, even as low as 8 to 9 per cent or less often being effective. The manner of adding the alkali is not a feature of this invention. It may be added in a dry state or in a water solution, or even in other solvents than water. A 50 per cent aqueous solution is a suitable form for the addition of caustic alkalies. The purpose of the partial neutralization may also be realized by an addition to tall oil of fatty acid and resin acid soaps.

The heat treatment suitably, but not necessarily, follows the partial neutralization.

The heat treatment and the partial neutralization complement each other to the extent that a more severe heat treatment compensates for a more limited neutralization, and vice versa.

The following example will illustrate one possible application of the principles of the present invention.

A tall oil decolorized with fuller's earth to a color value of 4L-3, an acid value of 174.0, and a viscosity of M was treated, after removal of the petroleum naphtha by distillation, with 2 per cent, by weight, of soda ash and then heat treated for 3 hours at 280° to 285° C. to yield a tall oil having a color value of 3L, an acid value of 148, a viscosity W, and an optical rotation of +15°.5. On standing for 5 months, no crystallization occurred, but the tall oil did darken to 4L. This change takes place in a few days in purified tall oil not heat treated and partially neutralized as disclosed hereinabove, and darkening of non-treated tall oil continues beyond this point.

Our invention thus consists of a method of treating tall oil comprising an optional purification by treatment with fuller's earth or by selective extraction followed by a partial neutralization of the acid value of the tall oil or by an addition of a soap combined with a heat treatment at a temperature above 250° C. and below the temperature of decomposition, for a period of time sufficient to effect, in conjunction with said partial neutralization or addition of a soap, a complete stabilization of the tall oil. The product obtainable by these processes may be characterized as a pale, nearly odorless, stable tall oil comprising only a trace of sulfur (in the form of metallic sulfides) and containing fatty acid material and resinous material in a ratio substantially not different from that obtaining in a crude tall oil.

We are aware that numerous details of the present invention may be varied through a wide range without departing from the principles of this invention, and we, therefore, do not purpose limiting the patent granted hereon otherwise than necessitated by the appended claims.

We claim as our invention:

1. A method of stabilizing tall oil including filtering the tall oil through an adsorbent material, neutralizing with an alkali from 8 to 18 per cent of the total acidity of said tall oil, and heat-treating said tall oil under non-decomposing conditions at between 260° and 325° C. for from 8 hours to 10 minutes.

2. A method of stabilizing tall oil including filtering the tall oil through an adsorbent material, neutralizing with an alkali from 8 to 18 per cent of the acidity of said tall oil and heat-treating said tall oil under non-decomposing conditions at between 260° and 300° C. for from 8 to 1 hours.

3. A stable pale nearly odorless tall oil heat treated under non-decomposing conditions at between 260° and 325° C. for from 8 hours to 10 minutes and having incorporated therewith a water soluble soap formed by the neutralization of from 8 to 18 per cent of the acid content of said tall oil.

4. A pale nearly odorless tall oil heat treated at between 260° and 300° C. which on standing does not separate into a liquid and a solid phase, from 8 to 18 per cent of the acids of said tall oil being neutralized with an alkali to form a water soluble soap suspended in said tall oil.

ANTHONY F. OLIVER.
ROBERT C. PALMER.